Figure 1:
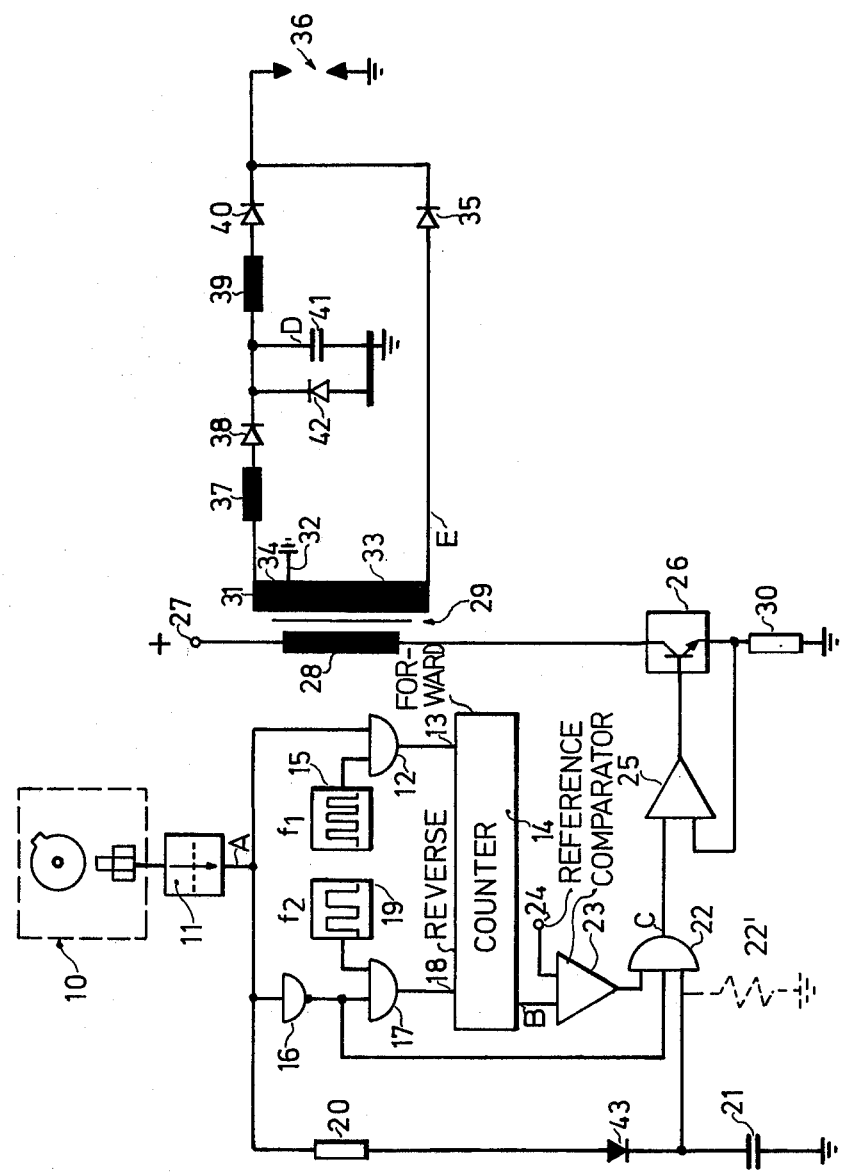

United States Patent [19]

Gräther et al.

[11] 4,083,347
[45] Apr. 11, 1978

[54] HIGH ENERGY SPARK IGNITION SYSTEM, PARTICULARLY FOR INTERNAL COMBUSTION ENGINES

[75] Inventors: Günter Gräther, Pinache; Friedrich Rabus, Schwieberdingen, both of Germany

[73] Assignee: Robert Bosch GmbH, Stuttgart, Germany

[21] Appl. No.: 762,326

[22] Filed: Jan. 25, 1977

[30] Foreign Application Priority Data

Feb. 20, 1976 Germany .............................. 2606890

[51] Int. Cl.² ............................ F02P 1/00; F02P 3/00
[52] U.S. Cl. ........................ 123/148 E; 123/148 DS; 123/148 DC; 123/148 CA; 123/146.5 A; 315/209 T
[58] Field of Search ..... 123/148 E, 148 DS, 148 DC, 123/148 CA, 146.5 A, 148 D; 315/209 T, 209 M, 209 CD; 123/117 D, 148 C, 179 BG

[56] References Cited

U.S. PATENT DOCUMENTS

| | | | |
|---|---|---|---|
| 1,547,635 | 5/1921 | Akers | 123/179 BG |
| 2,852,588 | 9/1958 | Hartman, Jr. | 123/179 BG |
| 3,963,015 | 6/1976 | Haubner et al. | 123/148 E |
| 3,993,035 | 11/1976 | Gerry | 123/148 E |
| 4,007,724 | 2/1977 | Mura | 123/148 E |

Primary Examiner—Charles J. Myhre
Assistant Examiner—R. A. Nelli
Attorney, Agent, or Firm—Flynn & Frishauf

[57] ABSTRACT

To provide a sharp voltage pulse to break down the spark gap of a spark plug, an ignition coil is constructed to have two secondary winding portions, one providing a high-voltage output and the other providing high energy level or current output. The high current output portion is connected through a diode to charge a capacitor which is further connected through an additional blocking diode to the spark gap, to which also the high voltage portion is connected, so that the spark gap will be supplied by a circuit common to both winding portions of the ignition coil, the high voltage pulse breaking down the spark gap and the high energy pulse, of lower voltage, however, providing spark energy for an extended period of time after initial breakdown of the gap. Preferably, the system is transistor-controlled, with the ignition instant being determined by a digital counter counting forward and reversely under control of a rotation-pulse transducer coupled to the crankshaft of the engine.

20 Claims, 2 Drawing Figures

HIGH ENERGY SPARK IGNITION SYSTEM, PARTICULARLY FOR INTERNAL COMBUSTION ENGINES

The present invention relates to a high energy spark ignition system, and more particularly to an ignition system for externally ignited internal combustion (IC) engines to generate an ignition spark in spark plugs which have a high overall ignition energy available at the spark plug in two portions: a high-voltage portion, to break down the spark, and high power portion to provide high ignition energy generated by a high ignition current.

It has previously been proposed to obtain high energy sparks in ignition systems by providing a high voltage portion which causes initial ignition of the spark gap, for example at a spark plug, and then follow up the initial pulse with a power current flow to obtain, overall, high sparking energy. Such ignition systems as proposed are complex and it is difficult to match the high voltage portion and the power portion to each other.

It is an object of the present invention to provide a high energy ignition system, more particularly adapted to provide a spark at the spark plug of a IC engine which has a high voltage breakdown portion and a power portion, which system is simple, inexpensive in construction, and in which the portions can readily be matched to each other and using an ignition coil which does not require any particularly complex or unusual construction.

Subject matter of the present invention

Briefly, a switching circuit is provided connected in the primary of the ignition coil. The secondary of the ignition coil is separated into two ranges, for example by tapping an ordinarily wound secondary in such a way that one portion is provided having many turns to supply a high voltage output pulse to break down the spark gap, the second portion having substantially fewer windings to provide power to charge a capacitor. Both the high voltage spark pulse as well as the capacitor discharge pulse are applied to the spark gap, typically the spark gap of a spark plug, which is connected to both ranges or portions of the secondary winding. Preferably, decoupling diodes are provided in the output circuits of the two winding portions and in their connection to the spark plugs to prevent spurious discharge of the capacitor.

In accordance with a feature of the invention, the recharge time of the capacitor can be controlled by including a choke or an inductance between the capacitor and the spark gap; the choke may also be replaced by an RC timing circuit.

Constant re-charging energy is desirable in order to obtain uniformity of ignition pulses. This requires equal charge on the capacitor, independently of voltage variations in the supply voltage. In accordance with a further feature of the invention, the charge time of the capacitor includes a transistor switch, the collector-emitter current of which is controlled by a current control circuit.

Figure 2:
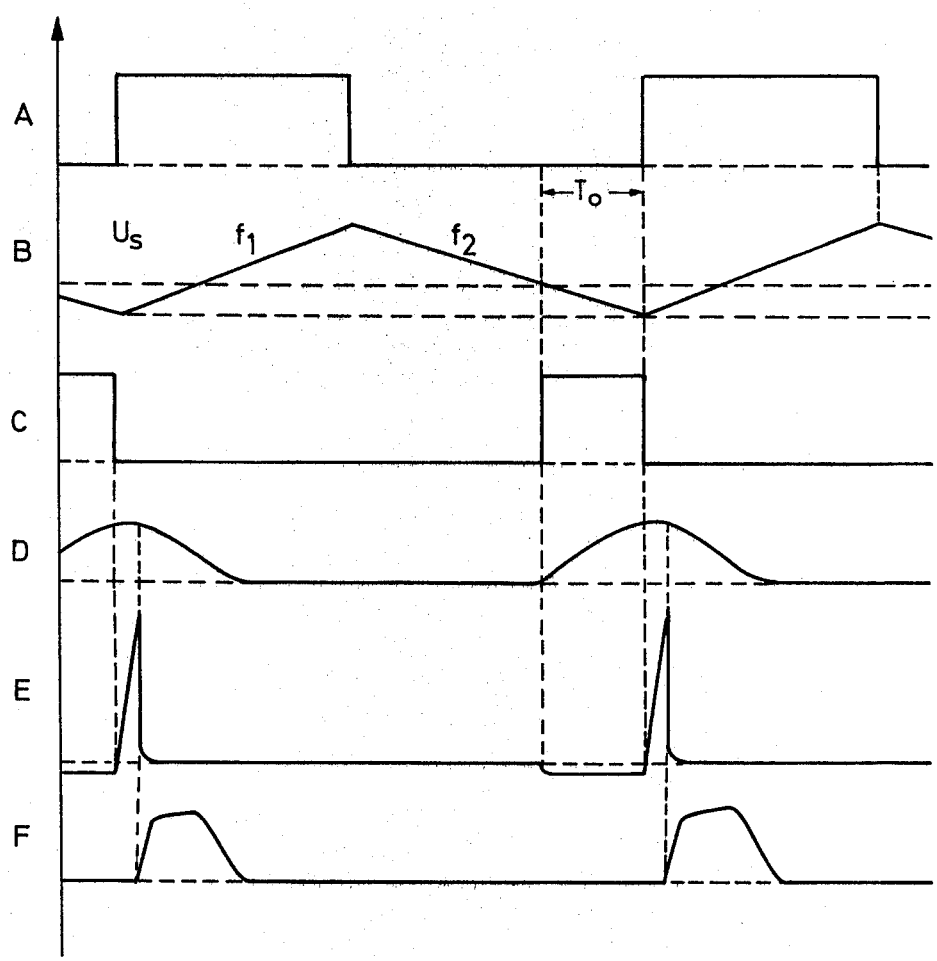

The invention will be described by way of example with reference to the accompanying drawings, wherein:

FIG. 1 is a schematic block diagram of a circuit in accordance with the present invention; and FIG. 2 depicts a series of timing graphs, illustrating voltage and current diagrams which will be referred to in the explanation of the operation of the circuit in accordance with the present invention.

A transducer 10 (FIG. 1) is coupled to the input of a wave-shaping stage 11, for example a Schmitt trigger. The transducer 10 may be the breaker contact of a breaker-distributor assembly of an IC engine; it may also be a contactless breaker, for example an inductive transducer or the like. For each ignition event, transducer 10 provides at least one pulse. The output of wave-shaping stage 11 is connected to an input of a first AND-gate 12, the output of which is connected to the forward count input 13 of a counter 14. A second input 12 is connected to the output of a frequency generator 15 which provides count pulses of a predetermined frequency $f_1$. The output of the wave-shaping station 11 is further connected to an inverter 16 and then to one input of an AND-gate 17, the output of which is connected to a reverse or backward count input 18 of the counter 14. A second input of second AND-gate 17 is connected to the output of a second frequency generator 19 having a frequency of $f_2$. The output of the wave-shaping stage 11 is further connected to a series circuit including a resistor 20, a diode 43 and a capacitor 21. The junction between the diode 43 and capacitor 21 is connected to one input of a third AND-gate 22. The output of the inverter stage 16 is connected to a second input of the AND-gate 22.

The output counter 14 is connected to a comparator 23, the output of which is connected to a third input of the AND-gate 22. The comparator 23 compares the count state at the output of the counter 14 with a reference value which is applied thereto by means of a terminal 24. The comparator 23 is a threshold comparator which provides an output signal when the count state drops below a predetermined value, namely the value applied to the reference terminal 24. The value at reference terminal 24 may be fixed, may be pre-programmed in accordance with changes in predetermined parameter, or may be the output signal from a device, not further shown in FIG. 1, which changes the reference at terminal 24 in dependence on supply voltage or other operating parameters of the IC engine or, generally, the apparatus with which the ignition system is to cooperate.

The output of the third AND-gate 22 is connected to one input of a control amplifier 25, the output of which is connected to the control input of a control stage 26 which, in its simplest form, is a transistor or a Darlington-connected transistor combination. The system is supplied from the positive terminal 27, for example of a vehicle battery, which is connected to the primary 28 of an ignition coil, then through the control path, for example the emitter-collector path of switching stage 26, and then through a resistor 30 to ground or chassis. The junction between the control stage 26 and resistor 30 is connected back as a feedback input to the control amplifier 25.

The ignition coil 29 has a secondary winding 31 which is tapped off-center with respect to its windings. The tap point 32 is connected to ground or chassis and separates the secondary 31 into two ranges or portions 33, 34. The first portion 33 has a multiplicity of windings. The ungrounded terminal is connected over a first decoupling diode 35 directly to the spark gap 36, for example to the insulated terminal of a spark plug, as is customary for IC engines. The second portion 34 of ignition coil 29 is connected through the series circuit of a first inductance or choke 37, a blocking diode 38, a second inductance or choke 39 and a second blocking or decoupling diode 40 and then to the spark plug 36. The inductances 37, 39 which are shown as inductive chokes in the drawings function as timing elements; they may, selectively, be replaced by R/C circuit combinations. The junction point between the blocking diode 38 and the second inductance 39 is connected to ground or chassis through the parallel combination of a capacitor 41 and a free-wheeling parallel diode 42.

Operation, with reference to FIG. 2: The output signal from the transducer, as processed by the wave-shaping circuit 11, is illustrated in graph A of FIG. 2. If a signal A is applied to the first AND-gate 12, count impulses $f_1$ can be applied from first frequency generator 15 to the forward count input 13 of counter 14. Simultaneously, the inverter 16 blocks application of pulses from frequency generator 19 to the counter. At the end of each A signal, the AND-gate 12 will block and the second AND-gate 17 will open, to pass count pulses at frequency $f_2$ from generator 19 to the backward or reverse count input terminal 18. Counter 14 will thus count forward at frequency $f_1$ during a signal A, and will count backwards at the frequency $f_2$ during pulse gaps between pulses A. If the ON/OFF ratio of the pulses and pulse gaps is unity, then frequencies $f_1$ and $f_2$ may be identical, and only a single frequency generator is needed, supplying both AND-gates 12 and 17. The relationship of the frequencies, $f_1$ to $f_2$, will change in accordance with the duty cycle or the ON/OFF ratio of the pulses A. The count state of counter 14 should have a predetermined value upon the occurrence of each new signal A; a suitable predetermined value is zero, or any other constant value which may be set therein.

The output from counter 14 is shown in graph B (FIG. 2) which is compared in comparator 23 with a reference threshold from terminal 24. The reference threshold is indicated as a voltage value $U_s$, applied to the terminal 24. When the count state of the output terminal of the counter 14 drops below the value $U_s$, the comparator 23 provides an output signal to the AND-gate 22. The AND-gate 22 will have an output signal, indicated at graph C in FIG. 2, only if, simultaneously, the inverter 16 has provided an output signal, that is, if no signal indicative of a pulse A is present.

The third input to the AND-gate 22 prevents current flow through the primary 28 of coil 29, that is, opening of the switch 26 if the current is connected — for example through an ignition switch — without, however, ignition being commanded. The combination of capacitor 21, resistor 20 and diode 23 thus prevents unnecessary quiescent current flow through coil 29 and functions as follows: Unless pulses are provided from the transducer 10, the capacitor 21 is discharged. This blocks the AND-gate 22. The capacitor 21 charges after generation of a few pulses from the wave-shaping circuit 11; the AND-gate 22 will be enabled when the charge on the capacitor 21 has reached the response or threshold level of the AND-gate 22. Although the ignition may remain connected, if the engine is stopped, capacitor 21 will discharge slowly through the input resistors of the AND-gate 22, schematically indicated by dotted resistor 22'; when the capacitor 21 has discharged below the response threshold of the AND-gate 22, the AND-gate 22 will block and effectively prevent current flow through the primary 28 of coil 29.

Control amplifier 25 controls current through the elements 26, 28, 30 by feedback of the current flow sensed by resistor 30 to amplifier 25. The signal C has a constant value, so that, as current through the resistor 30 drops, control amplifier 25 can control the element 26 to decrease its resistance, thus permitting higher current flow through the primary 28 of the ignition coil; control amplifier 25, in combination with resistor 30, thus operates as a current control circuit for current flow through the primary of coil 29.

Capacitor 41 (FIG. 1) is charged to a constant value during the time $T_o$, that is, during the time that current flows through the primary 28 of ignition coil 29, in accordance with transformer action. When used for, and in combination with an internal combustion engine, ignition coil 29 can be so dimensioned that, upon interruption of current flow through the primary 28, the arc-over voltage in the range 33, applied across the spark gap 36, is about 30 kV, the charge voltage on capacitor 41, generated by the portion 34, should be about 2 kV. The voltage of 30 kV effects immediate breakdown, and the charge voltage of 2 kV on the capacitor 41 is sufficient to maintain current flow through the gap 36, once sparking has been initiated.

The control circuit for switch 36 can be of any kind, and the invention is not restricted to the particular circuit described in connection therewith. Switch 26 can be directly controlled from the breaker cam of a distributor-breaker assembly; or it can be electronically controlled, for example by analog technology. An analog-control system can readily be constructed by replacing the counter 14 by an integrator-accumulator, for example by a capacitor; instead of the frequency generators, constant current sources are then provided to charge the capacitor for the duration of the pulse A, and to discharge the capacitor for the duration occurring between the pulse gaps. The charge-discharge rates can be matched to the relative ON/OFF durations of the pulses from circuit A. As a general principle, any type of ignition control system can be used to control switch 26, which need not be a semiconductor switch. The control system for the switch 26 can also be used independently for other ignition systems having different types of ignition coils with different secondaries and different secondary circuits, or to control further ignition triggering circuits.

An ignition coil 29, as shown, with a tapped secondary is preferred; it is also possible to construct the ignition coil with two separate secondary windings.

Various changes and modifications may be made within the scope of the inventive concept.

We claim:
1. High energy spark ignition system to provide, at a spark gap (36), a spark pulse having a high voltage portion (FIG. 2: E) to break down the gap of the spark gap (36) and a high current portion (FIG. 2: F) to provide ignition energy to the gap after breakdown, comprising, in accordance with the invention;
   an ignition coil (29) having a primary winding (28) and two secondary winding portions (33, 34), a first winding portion (33) having a large number of turns to provide a high voltage output, and the second winding portion (34) having a substantially lesser number of turns to provide high current output;
   switch means (26) controlling current flow through the primary winding (28) and interrupting current flow therethrough to release stored electromagnetic energy to the secondary;

a charge storage capacitor (41) to receive and store energy from the second winding portion (34) and provide a high energy discharge pulse;

and means applying both the high voltage pulse and the high energy capacitor discharge pulse to the spark gap (36) comprising a circuit common to both said winding portions (33, 34) of the spark coil (29) and to the spark gap (36).

2. System according to claim 1, further comprising decoupling diodes (35, 40) connected in circuit between the respective winding portions (33, 34) and the spark gap (36) to decouple the high voltage, first winding portion (33) from the high power, second portion (34) of the coil (29) and the capacitor (41).

3. System according to claim 2, wherein one decoupling diode (35) is connected in series with the first, high voltage portion (33) of the coil (29) and said common circuit, and a second decoupling diode (40) is connected in series between the second, high energy winding portion (34), said capacitor, and said common circuit.

4. System according to claim 1, further comprising a timing circuit connected between the capacitor (41) and said common circuit to control the discharge time of the capacitor through the spark gap (36).

5. System according to claim 4, wherein said timing circuit comprises an inductance (39).

6. System according to claim 1, further comprising a free-wheeling diode (42) connected in parallel with the capacitor (41) to ensure complete discharge of the capacitor before each new re-charging cycle after opening of said switch means and upon subsequent re-closing of said switch means.

7. System according to claim 1, further comprising a blocking diode (38) connected between the capacitor (41) and the second high energy winding portion (34) to permit charging of the capacitor through said blocking diode (38), but inhibit discharging of the charge capacitor through the second winding portion (34) to ensure discharge of the capacitor (41) through said common circuit and hence through the spark gap (36) after breakdown thereof.

8. System according to claim 1, further comprising timing circuit means (37) connected between the second, high current output winding portion (34) and the capacitor (41) to control the rate of charge being applied to the capacitor.

9. System according to claim 8, wherein said timing circuit means comprises an inductance (37) controlling the time during which the capacitor (41) is being charged upon change in current flow through the primary winding (28) of the coil.

10. System according to claim 1, wherein the switch means (26) is a cyclically controlled transistorized switch including the emitter-collector path of a transistor (26);

and a current control circuit (25, 30) is connected to the transistor (26) to control current flow and the rate of change of current flow therethrough as a function of actual current flowing through the primary winding (28) of the coil (29) to thereby control the charge time of charge being applied to the capacitor from the second, high current portion (34) of the ignition coil (29) by transformer action.

11. System according to claim 10, further comprising a decoupling diode (35) serially connected between the first, high voltage portion (33) and said common circuit, and hence said spark gap (36);

a second decoupling diode serially connected between the second, high current winding portion (34) of the ignition coil (29) and the capacitor and poled to permit passage of charge current from said second winding portion to the capacitor, but prevent discharge of the capacitor through said winding portion;

and a third decoupling diode (40) connected between the junction of said second diode (38) and said capacitor (41) and said common circuit and hence said spark gap (36) to provide for discharge of the capacitor (41) through said spark gap when the voltage due to the high voltage output from the first winding portion has dropped below the maximum charge voltage on the capacitor (41).

12. System according to claim 11, further including current flow control means (37, 39) included in circuit with said second winding portion (34) and said common circuit to control the timing and rate of current flow therethrough.

13. Automotive ignition systems to provide spark energy to an automotive engine spark plug
comprising the system of claim 1
and further including
a pulse transducer (10, 11) providing pulses in synchronism with rotation of the engine crankshaft;
a bi-directional counter (14);
frequency generator means (15, 19) providing count clock frequencies, and connected to the forward and reverse count inputs of said bi-directional counter (14);
logic circuit means (12; 16, 17) connecting the clock pulses from the frequency generator means, respectively, to the forward and to the reverse count terminals and to said pulse transducer (10, 11) to control application of the count clock pulses from the frequency generator means, alternatingly, to the forward and reverse count inputs during alternating pulses, and pulse gaps, respectively, whereby the bi-directional counter will count in one direction during occurrence of a pulse and count in reverse direction during the succeeding pulse gap;
a comparator (23) connected to the output of the counter;
a reference signal source (24) applied to the comparator, the comparator comparing the count state as derived from the counter with the reference;
and control circuit means (22, 25) connected to said switch means (26) to control the state, and the instant of change of state of said switch means.

14. System according to claim 13, wherein said switch means comprises a transistor switch (26).

15. System according to claim 13, wherein the frequency generator means (15, 19) comprises two frequency generators having different output frequencies, one frequency generator, each, being connected through said logic means, respectively, to the forward and reverse count input terminals of the bi-directional counter (14).

16. System according to claim 15, wherein the frequency generators provide clock signals to the bi-directional counter (14) which are matched to the respective durations of the ON/OFF periods of the pulses derived from the pulse transducer (10, 11).

17. System according to claim 13, further comprising an AND-gate (22) connected between the output of the comparator (23) and said switch means (26);

an inverter (16) connected to the output of the pulse transducer (10, 11) and having its output connected as a further input to said AND-gate (22).

18. System according to claim 17, further including a quiescent current turn-off circuit comprising a timing circuit (20, 43, 21, 22') connected to the pulse transducer (10, 11) and having an output connected to the AND-gate and permitting opening of the AND-gate only after a predetermined number of pulses from the pulse transducer means (10, 11) have been sensed within a predetermined time.

19. System according to claim 18, wherein the timing circuit comprises a resistor-capacitor circuit (20, 21) and a coupling diode (43) connected to the AND-gate (22), the resistance-capacitor circuit being charged by successive pulses from the pulse transducer (10, 11) and enabling the AND-gate when the capacitor has reached a predetermined charge level;

and a discharge leakage resistor (22') connected to the capacitor (21) and permitting gradual discharge thereof below the enabling threshold of the AND-gate unless the capacitor (21) is re-charged by further succeeding pulses from the pulse transducer (10, 11) to disable the AND-gate (22) and hence open said switch means (26) and thus inhibit current flow through said switch means and hence through the primary winding (28) of the ignition coil (29) in the absence of continuously recurrent pulses from the pulse transducer (10, 11) indicative of rotation of the engine.

20. System according to claim 13, further comprising a quiescent current turn-off circuit comprising an R/C timing circuit (20, 21, 22'), the timing circuit having a first predetermined START time interval and a second predetermined DISCONNECT time interval, and selectively energizable coupling means (43; 22) connecting the timing circuit to the pulse transducer (10, 11) and to said switch means (26), said timing circuit inhibiting closing of the switch until, during occurrence of pulses from the pulse transducer (10, 11), the START time has elapsed and disabling the switch means (26) upon cessation of pulses from the pulse transducer and elapse of the second or DISCONNECT time.

* * * * *